United States Patent
Kim

(10) Patent No.: US 9,842,573 B2
(45) Date of Patent: Dec. 12, 2017

(54) APPARATUS AND METHOD FOR GAUSSIAN FILTERING

(71) Applicant: ELECTRONICS AND TELECOMMUNICATIONS RESEARCH INSTITUTE, Daejeon (KR)

(72) Inventor: Hyuk Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 219 days.

(21) Appl. No.: 14/951,152

(22) Filed: Nov. 24, 2015

(65) Prior Publication Data
US 2016/0148358 A1    May 26, 2016

(30) Foreign Application Priority Data

Nov. 24, 2014 (KR) .................. 10-2014-0164772
Sep. 4, 2015 (KR) .................. 10-2015-0125771

(51) Int. Cl.
*G09G 5/39* (2006.01)
*G06T 1/60* (2006.01)
*G06T 5/00* (2006.01)
*G06T 5/20* (2006.01)

(52) U.S. Cl.
CPC .................. *G09G 5/39* (2013.01); *G06T 1/60* (2013.01); *G06T 5/002* (2013.01); *G06T 5/20* (2013.01); *G09G 2360/18* (2013.01)

(58) Field of Classification Search
CPC ........ G09G 5/39; G09G 2360/18; G06T 5/20; G06T 5/002; G06T 1/60
USPC ........................................................ 382/260
See application file for complete search history.

(56) References Cited

U.S. PATENT DOCUMENTS

| | | |
|---|---|---|
| 8,542,942 B2 | 9/2013 | Wong et al. |
| 2010/0322526 A1 | 12/2010 | Lee et al. |
| 2014/0078172 A1* | 3/2014 | Systrom .................. G06T 5/002 345/629 |
| 2014/0348250 A1 | 11/2014 | Cho et al. |

FOREIGN PATENT DOCUMENTS

| | | |
|---|---|---|
| KR | 10-2010-0136391 | 12/2010 |
| KR | 10-2014-0138537 | 12/2014 |

OTHER PUBLICATIONS

Neil Pittman et al., "Image Segmentation Using Hardware Forest Classifiers," FCCM '13, Proceedings of the 2013 IEEE 21st Annual International Symposium on Field-Programmable Custom Computing Machines, 2013, pp. 73-80.

* cited by examiner

*Primary Examiner* — Amandeep Saini

(57) ABSTRACT

An apparatus for Gaussian filtering includes an image buffer for generating mask region data which includes pixel values of pixels located on a mask in an input image, and a Gaussian filter core for arranging the mask region data to generate pixel array values referring to an index array corresponding to a size of the mask, and applying Gaussian filtering to the pixel array values to generate Gaussian filtering values.

14 Claims, 13 Drawing Sheets

FIG. 11A

| 5.5 | 5.4 | 5.3 | 5.2 | 5.1 | 5.2 | 5.3 | 5.4 | 5.5 |
|---|---|---|---|---|---|---|---|---|
| 4.5 | 4.4 | 4.3 | 4.2 | 4.1 | 4.2 | 4.3 | 4.4 | 4.5 |
| 3.5 | 3.4 | 3.3 | 3.2 | 3.1 | 3.2 | 3.3 | 3.4 | 3.5 |
| 2.5 | 2.4 | 2.3 | 2.2 | 2.1 | 2.2 | 2.3 | 2.4 | 2.5 |
| 1.5 | 1.4 | 1.3 | 1.2 | (1.1) | 1.2 | 1.3 | 1.4 | 1.5 |
| 2.5 | 2.4 | 2.3 | 2.2 | 2.1 | 2.2 | 2.3 | 2.4 | 2.5 |
| 3.5 | 3.4 | 3.3 | 3.2 | 3.1 | 3.2 | 3.3 | 3.4 | 3.5 |
| 4.5 | 4.4 | 4.3 | 4.2 | 4.1 | 4.2 | 4.3 | 4.4 | 4.5 |
| 5.5 | 5.4 | 5.3 | 5.2 | 5.1 | 5.2 | 5.3 | 5.4 | 5.5 |

FIG. 11B

| 5.4 | 5.3 | 5.2 | 5.1 | 5.2 | 5.3 | 5.4 | 5.5 | 5.6 |
|-----|-----|-----|-----|-----|-----|-----|-----|-----|
| 4.4 | 4.3 | 4.2 | 4.1 | 4.2 | 4.3 | 4.4 | 4.5 | 4.6 |
| 3.4 | 3.3 | 3.2 | 3.1 | 3.2 | 3.3 | 3.4 | 3.5 | 3.6 |
| 2.4 | 2.3 | 2.2 | 2.1 | 2.2 | 2.3 | 2.4 | 2.5 | 2.6 |
| 1.4 | 1.3 | 1.2 | 1.1 | 1.2 | 1.3 | 1.4 | 1.5 | 1.6 |
| 2.4 | 2.3 | 2.2 | 2.1 | 2.2 | 2.3 | 2.4 | 2.5 | 2.6 |
| 3.4 | 3.3 | 3.2 | 3.1 | 3.2 | 3.3 | 3.4 | 3.5 | 3.6 |
| 4.4 | 4.3 | 4.2 | 4.1 | 4.2 | 4.3 | 4.4 | 4.5 | 4.6 |
| 5.4 | 5.3 | 5.2 | 5.1 | 5.2 | 5.3 | 5.4 | 5.5 | 5.6 |

FIG. 11C

| 5.3 | 5.2 | 5.1 | 5.2 | 5.3 | 5.4 | 5.5 | 5.6 | 5.7 |
|-----|-----|-----|-----|-----|-----|-----|-----|-----|
| 4.3 | 4.2 | 4.1 | 4.2 | 4.3 | 4.4 | 4.5 | 4.6 | 4.7 |
| 3.3 | 3.2 | 3.1 | 3.2 | 3.3 | 3.4 | 3.5 | 3.6 | 3.7 |
| 2.3 | 2.2 | 2.1 | 2.2 | 2.3 | 2.4 | 2.5 | 2.6 | 2.7 |
| 1.3 | 1.2 | 1.1 | 1.2 | 1.3 | 1.4 | 1.5 | 1.6 | 1.7 |
| 2.3 | 2.2 | 2.1 | 2.2 | 2.3 | 2.4 | 2.5 | 2.6 | 2.7 |
| 3.3 | 3.2 | 3.1 | 3.2 | 3.3 | 3.4 | 3.5 | 3.6 | 3.7 |
| 4.3 | 4.2 | 4.1 | 4.2 | 4.3 | 4.4 | 4.5 | 4.6 | 4.7 |
| 5.3 | 5.2 | 5.1 | 5.2 | 5.3 | 5.4 | 5.5 | 5.6 | 5.7 |

APPARATUS AND METHOD FOR GAUSSIAN FILTERING

CROSS-REFERENCE TO RELATED APPLICATION

This application claims priority to and the benefit of Korean Patent Application No. 2014-0164772, filed on Nov. 24, 2014, and No. 2015-0125771, filed on Sep. 4, 2015, the disclosure of which is incorporated herein by reference in its entirety.

BACKGROUND

1. Field of the Invention

The present invention relates to a filtering technology for an image, and more particularly, to a Gaussian filtering technology for an image.

2. Discussion of Related Art

An image recognizing system which recognizes an object in an image such as an face and gesture recognizing system is realized based on software not only in the field of an industrial field but also in a variety of application fields including a digital camera, a smart phone, an access control system and a digital door lock. However, recently, image input/output devices are becoming high quality, and systems supporting from a quarter video graphic array (QVGA) grade in a small scale to a high definition (HD) grade in a large scale come into wide use. A process of recognizing an object in an image includes Gaussian filtering.

That is, although performing the Gaussian filtering on a high resolution image in real time is required, because the Gaussian filtering is performed based on a processor through software in a general embedded system, there is a limit in processing the Gaussian filtering on a high resolution image in real time.

SUMMARY OF THE INVENTION

The present invention is directed to an apparatus and method for Gaussian filtering performing Gaussian filtering through hardware.

According to an aspect of the present invention, there is provided an apparatus for Gaussian filtering including an image buffer configured to generate mask region data which includes pixel values of pixels located on a mask in an input image, and a Gaussian filter core configured to arrange the mask region data to generate pixel array values referring to an index array corresponding to a size of the mask, and apply Gaussian filtering to the pixel array values to generate Gaussian filtering values.

The image buffer may include a plurality of first delay elements serially connected to each other configured to sequentially receive and store the pixel values of the input image, and output the stored pixel values of the input image to the Gaussian filter core, and a plurality of image row storage units serially connected to each other configured to output pixel values corresponding to a single row of the input image to the Gaussian filter core when all the pixel values corresponding to the single row are received, wherein at least one of the plurality of first delay elements outputs the pixel values of the input image to another one of the first delay elements, and at least one of the plurality of image row storage units outputs the pixel values corresponding to the single row to another one of the image row storage units.

Each of the plurality of image row storage units may include a plurality of second delay elements serially connected to each other configured to sequentially receive and store the pixel values corresponding to the single row, and output the stored pixel values corresponding to the single row to the Gaussian filter core, and a first-in first-out (FIFO) module configured to sequentially output the pixel values corresponding to the single row to the other image row storage unit, one of the plurality of second delay elements, and the Gaussian filter core when all the pixel values corresponding to the single row from the other image row storage unit or an outside are received, wherein at least one of the plurality of second delay elements outputs the pixel values of the input image to another one of the plurality of second delay elements.

The Gaussian filter core may include an index generator configured to generate a row index and a column index referring to the index array corresponding to the size of the mask, a plurality of routers configured to arrange a part of the mask region data based on the row index and the column index to generate the pixel array values, and a filter core configured to apply the Gaussian filtering to a matrix having the pixel array values as one row to generate the Gaussian filtering values.

The index generator generates the row index and the column index, each of which includes an index corresponding to a coordinate of a mask center in the index array, the index corresponding to each row.

An $(int(n/2)+1)^{th}$ row of the index array is a row in which values of 0 to n−1 are sequentially arranged, and each of indexes located in an $(int(n/2)+1)^{th}$ column of the index array has a value of $int(n/2)$, and each of indexes located above the $(int(n/2)+1)^{th}$ row among indexes of the index array has a value bigger by one than an index adjacent to the right side when an index column is less than (int(n/2)+1-index row), and has a value smaller by one than the index adjacent to the right side when an index column is equal to or greater than (int(n/2)+1-index row), and each of indexes located below the $(int(n/2)+1)^{th}$ row among indexes of the index array has a value smaller by one than an index adjacent to the left side when an index column is greater than (int(n/2)+(n-index row), and has a value bigger by one than the index adjacent to the left side when an index column is equal to or less than (int(n/2)+(n-index row), wherein n is a horizontal length or vertical length of the mask, and the index column is the column number of the index and the index row is the row number of the index, and the int(n/2) is an integer number of n/2.

Each of the plurality of routers arranges a pixel value corresponding to each index included in the row index of the pixel values located in a row corresponding to the row index in the mask region data according to a location on the row index of the index to generate the pixel array values.

According to another aspect of the present invention, there is provided a method for performing Gaussian filtering on an input image by an apparatus for Gaussian filtering including an image buffer and a Gaussian filter core, the method comprising generating, by the image buffer, mask region data which includes pixel values of pixels located on a mask in an input image, arranging, by the Gaussian filter core, the mask region data referring to an index array corresponding to a size of the mask to generate pixel array values, and applying, by the Gaussian filter, Gaussian filtering to the pixel array values to generate Gaussian filtering values.

The generating by the image buffer of the mask region data which includes the pixel values of the pixels located on the mask in the input image may be performed by the image buffer including a plurality of first delay elements serially connected to each other configured to sequentially receive and store the pixel values of the input image and output the stored pixel values of the input image to the Gaussian filter core, and a plurality of image row storage units serially connected to each other configured to output pixel values corresponding to a single row of the input image to the Gaussian filter core when all the pixel values corresponding to the single row are received, wherein at least one of the plurality of first delay elements outputs the pixel values of the input image to another one of the plurality of first delay elements, and at least one of the plurality of image row storage units outputs the pixel values corresponding to the single row to another one of the plurality of image row storage units.

The generating by the image buffer of the mask region data which includes the pixel values of the pixels located on the mask in the input image may be performed by the image buffer that includes a plurality of image row storage units, each image row storage unit including a plurality of second delay elements serially connected to each other configured to sequentially receive and store the pixel values corresponding to the single row and output the stored pixel values corresponding to the single row to the Gaussian filter core, and a first-in first-out (FIFO) module configured to sequentially output the pixel values corresponding to the single row to the other image row storage unit, one of the plurality of second delay elements, and the Gaussian filter core when all the pixel values corresponding to the single row from the other one of the plurality of image row storage units or an outside are received. At least one of the plurality of second delay elements outputs the pixel values of the input image to the other one of the plurality of second delay elements.

The arranging by the Gaussian filter core of the mask region data to generate the pixel array values referring to the index array corresponding to the size of the mask may include generating, by an index generator, a row index and a column index referring to the index array corresponding to the size of the mask, arranging, by a plurality of routers, a part of the mask region data based on the row index and the column index to generate the pixel array values, and applying, by a filter core, the Gaussian filtering to a matrix having the pixel array values as one row to generate the Gaussian filtering values.

The generating by the index generator of the row index and the column index referring to the index array corresponding to the size of the mask may include generating the row index and the column index, each of which includes an index corresponding to a coordinate of a mask center of the index array, the index corresponding to each row.

An (int(n/2)+1)th row of the index array is a row in which values of 0 to n−1 are sequentially arranged, and each of indexes located in an $(int(n/2)+1)^{th}$ column of the index array has a value of int(n/2), and each of indexes located above the $(int(n/2)+1)^{th}$ row among indexes of the index array has a value of bigger by one than an index adjacent to the right side when an index column is less than (int(n/2)+1-index row), and has a value smaller by one than an index adjacent to the right side when an index column is equal to or greater than (int(n/2)+1-index row), and each of indexes located below the $(int(n/2)+1)^{th}$ row among indexes of the index array has a value smaller by one than an index adjacent to the left side when an index column is greater than (int(n/2)+(n-index row), and has a value bigger by one than an index adjacent to the left side when an index column is equal to or less than (int(n/2)+(n-index row). Here, n is a horizontal length or vertical length of the mask, and the index column is the column number of the index and the index row is the row number of the index, and the int(n/2) is an integer number of n/2.

The arranging by a plurality of routers of a part of the mask region data based on the row index and the column index to generate the pixel array values may be performed by each of the plurality of routers configured to arrange a pixel value corresponding to each index included in the row index of the pixel values located in a row corresponding to the row index in the mask region data according to a location on the row index of the index to generate the pixel array values.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 11A is a diagram illustrating a result of mirroring performed according to a column index and a row index based on coordinate of one mask center by a router included in a Gaussian filter core of an apparatus for Gaussian filtering according to an exemplary embodiment of the present invention;

FIG. 11B is a diagram illustrating a result of mirroring performed according to a column index and a row index based on coordinate of another mask center by a router included in a Gaussian filter core of an apparatus for Gaussian filtering according to an exemplary embodiment of the present invention;

FIG. 11C is a diagram illustrating a result of mirroring performed according to a column index and a row index based on coordinate of yet another mask center by a router included in a Gaussian filter core of an apparatus for Gaussian filtering according to an exemplary embodiment of the present invention;

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Further, in the present invention, when it is mentioned that a first element "transmits" a signal to a second element, the first element may be directly connected to the second element and transmit the signal to the second element, but if there is not a description which has contrary meaning, it will be understood that the first element can transmit the signal to the second element through another element existing between the two.

Figure 1:
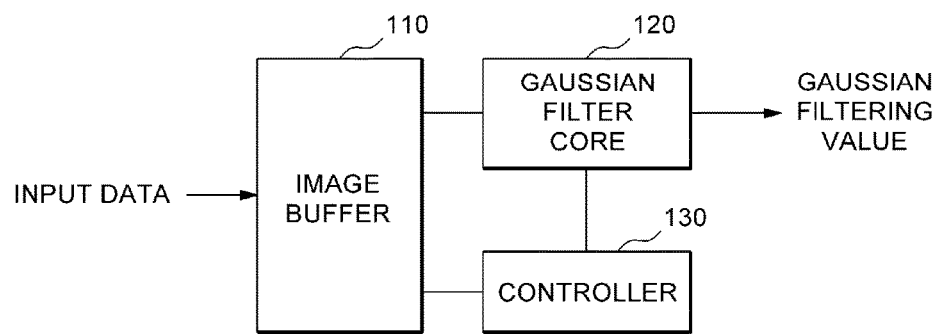
FIG. 1 is a block diagram illustrating an apparatus for Gaussian filtering according to an exemplary embodiment of the present invention.
Figure 2:
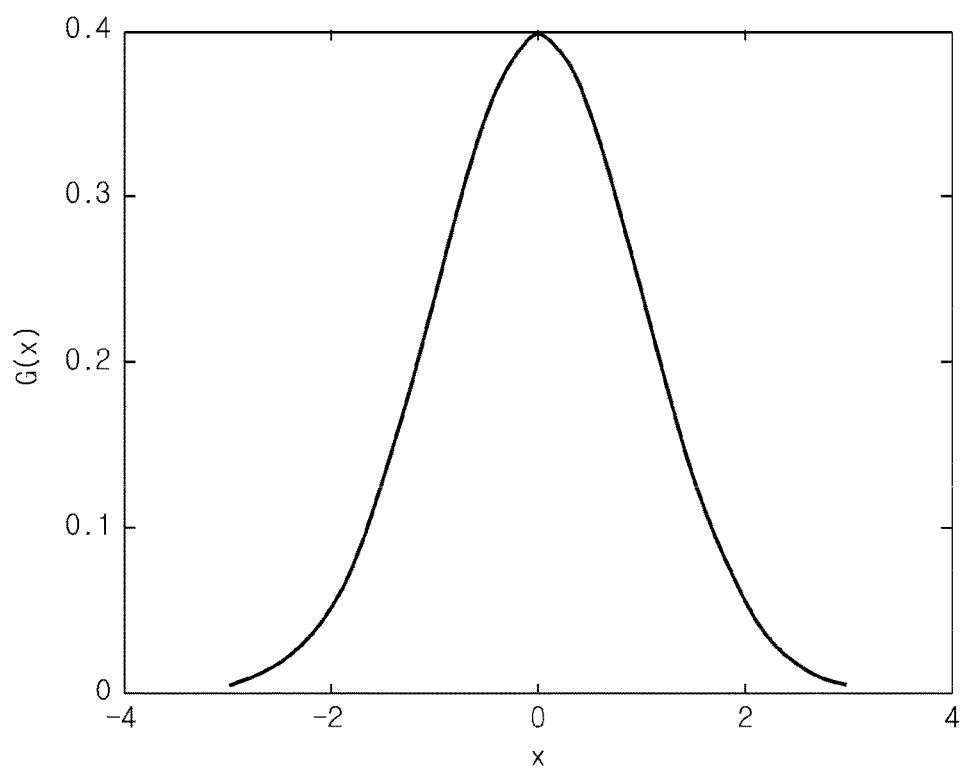
FIG. 2 is a diagram illustrating a Gaussian distribution used to Gaussian filtering by an apparatus for Gaussian filtering according to an exemplary embodiment of the present invention.
Figure 3:
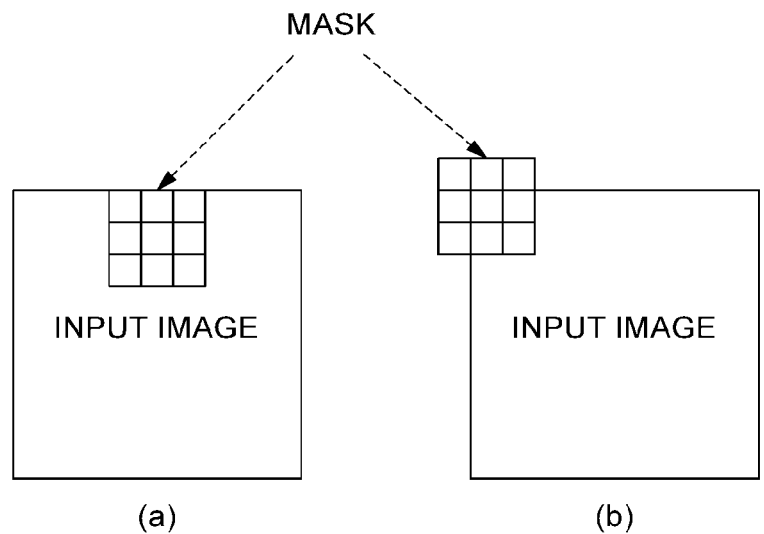
FIG. 3 is a diagram illustrating a mask used for an apparatus for Gaussian filtering according to an exemplary embodiment of the present invention.
Figure 4:
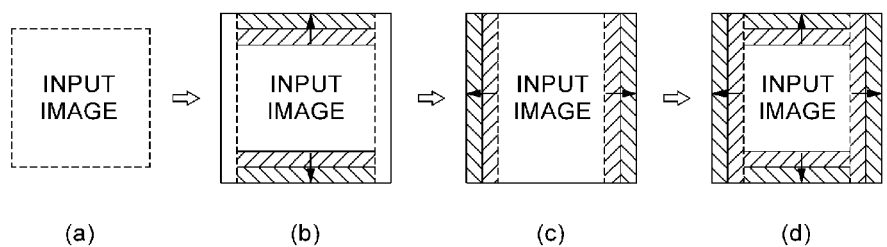
FIG. 4 is a diagram illustrating mirroring performed by an apparatus for Gaussian filtering according to an exemplary embodiment of the present invention.

FIG. 1 is a block diagram illustrating an apparatus for Gaussian filtering according to an exemplary embodiment of the present invention, FIG. 2 is a diagram illustrating a Gaussian distribution used to Gaussian filtering by an apparatus for Gaussian filtering according to an exemplary embodiment of the present invention, FIG. 3 is a diagram illustrating a mask used for an apparatus for Gaussian filtering according to an exemplary embodiment of the present invention, and FIG. 4 is a diagram illustrating mirroring performed by an apparatus for Gaussian filtering according to an exemplary embodiment of the present invention.

The apparatus for Gaussian filtering according to an exemplary embodiment of the present invention of FIG. 1 may include an image buffer 110, a Gaussian filter core 120 and a controller 130.

The image buffer 110 receives input data which is an image received from an external device, e.g. a camera, a device connected through a network and a storage medium, etc., and transmits pixel values, hereinafter referred to as mask region data, corresponding to a mask for Gaussian filtering among the input data to the Gaussian filter core 120.

The Gaussian filter core 120 performs the Gaussian filtering on the mask region data. Here, when mirroring with respect to the mask region data is needed, the Gaussian filter core 120 may apply the mirroring to the mask region data, and perform the Gaussian filtering on the mask region data to which the mirroring is applied.

The Gaussian filter core 120 performs the Gaussian filtering using a property of a Gaussian distribution. One-dimensional Gaussian distribution may be defined like Equation 1.

$$G(x) = \frac{1}{\sqrt{2\pi\sigma^2}} e^{-\frac{(x-\mu)^2}{2\sigma^2}} \quad \text{(Equation 1)}$$

Here, x denotes an element value which is an object of Gaussian filtering, which is each pixel value of an input image μ, denotes a mean value of each element value, and σ denotes a standard deviation of each element value. When $\mu=0$, $\sigma^2=1$, the one-dimensional Gaussian distribution may be a general normal distribution.

Here, the width of the Gaussian distribution may be determined by the standard deviation, and the size of a filter may be determined according to the width of the Gaussian distribution. As shown in FIG. 2, in the Gaussian distribution with the mean value of 0 and the standard deviation of σ, each element value distributes within a range of $-4\sigma \sim 4\sigma$, and as the magnitude of the standard deviation further increases, greater smoothing phenomenon may occur (each element value is distributed in a wider range).

The apparatus for Gaussian filtering according to an exemplary embodiment of the present invention performs the Gaussian filtering on an image, and therefore may use a two-dimensional Gaussian distribution as shown in Equation 2, which is a modified form of Equation 1.

$$G(x)G(y) = \frac{1}{2\pi\sigma^2} e^{-\frac{x^2+y^2}{2\sigma^2}} \quad \text{(Equation 2)}$$

Here, x denotes an x coordinate for each element having the Gaussian distribution, and y denotes a y coordinate for each element having the Gaussian distribution.

In the apparatus for Gaussian filtering according to an exemplary embodiment of the present invention, a Gaussian function representing the Gaussian distribution is a continuous function, but values of the Gaussian function may be calculated only when x and y are integers to make a mask. In the Gaussian distribution with the mean value of 0 and the standard deviation of σ, each element value exists in a range of $-4\sigma \sim 4\sigma$, and therefore the size of the mask may be set to be $(8\sigma+1) \times (8\sigma+1)$. Therefore, when the standard deviation is 1, the size of the mask may be 9×9. When the standard deviation is 0.4, the size of the mask may be 3×3, and when the standard deviation is 0.8, the size of the mask may be 5×5.

Here, the process of the Gaussian filtering using the mask having a size determined based on the standard deviation may be the process of calculating a sum of values for pixels of the input image corresponding to a mask at respective locations multiplied by filter coefficients by moving the mask on the input image.

When the mask is located as shown in FIG. 3a, all the corresponding pixels of the input image exist in the mask. However, when the mask is located as shown in FIG. 3b, regions in which pixels of the input image are not located may exist. Therefore, to effectively process the Gaussian filtering, it is required that pixels of the input image for all the locations are located in the mask through the mirroring as shown in FIG. 4.

When mirroring is performed in the upward and downward directions of the input image shown in FIG. 4a, as shown in FIG. 4b, for the uppermost row of the input image, rows corresponding to a specified range may be copied to an upper location of the uppermost row of the input image, and for the lowermost row of the input image, rows corresponding to a specified range may be copied to a lower location of the lowermost row of the input image. Further, when mirroring is performed in the leftward and rightward directions of the input image shown in FIG. 4a, as shown in FIG. 4c, for the leftmost row of the input image, rows corresponding to a specified range may be copied to a left location of the leftmost row of the input image, and for the rightmost row of the input image, rows corresponding to a specified range may be copied to a right location of the rightmost row of the input image. Here, the number of copied rows or copied columns may be less than (a size of mask−1).

As described above, the mirroring needs to calculate a location to be copied with respect to locations of pixels, and therefore the complexity of the calculation may be high. The Gaussian filter core 120 of the apparatus of the Gaussian filtering according to an exemplary embodiment of the present invention performs the mirroring by hardware, not by a processor, so that the Gaussian filtering in real time is possible. The detailed structure of the Gaussian filter core 120 will be described below with reference to FIGS. 7 to 9.

The controller 130 transmits information on a mask size which represents a size of the mask to the Gaussian filter core 120, and controls the Gaussian filter core 120 so that the Gaussian filter core 120 extracts mask region data output from the image buffer 110 to fit the mask size. Here, the controller 130 may receive an input for determining the mask size from a user and generate the information on the mask size in advance.

Figure 5:
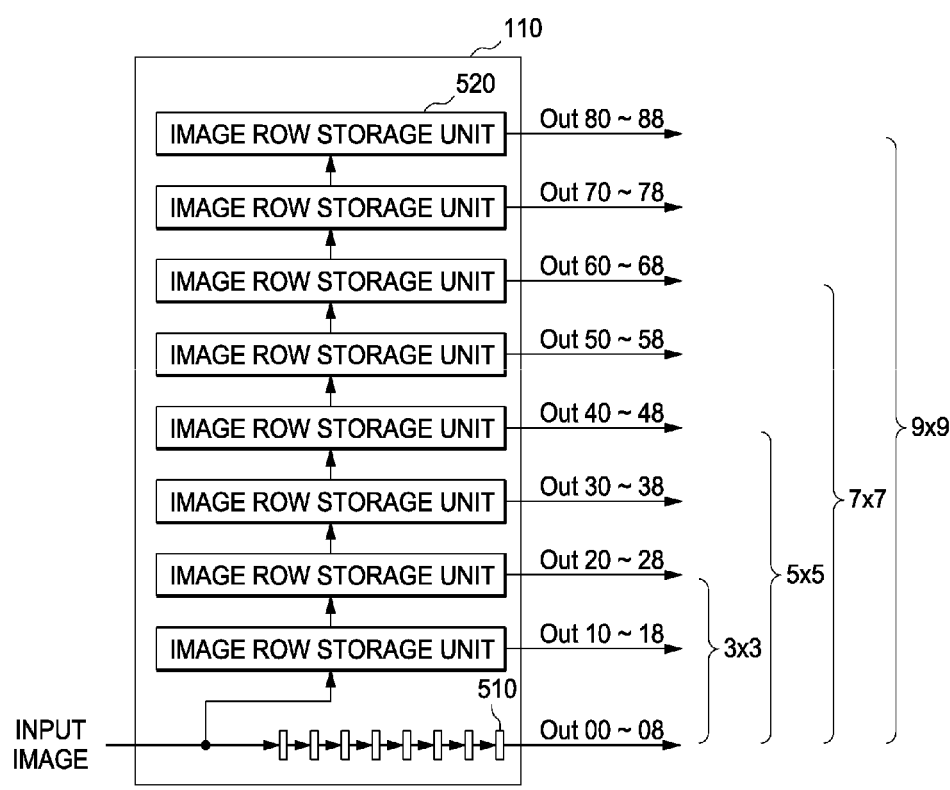
FIG. 5 is a diagram illustrating an image buffer of an apparatus for Gaussian filtering according to an exemplary embodiment of the present invention.
Figure 6:
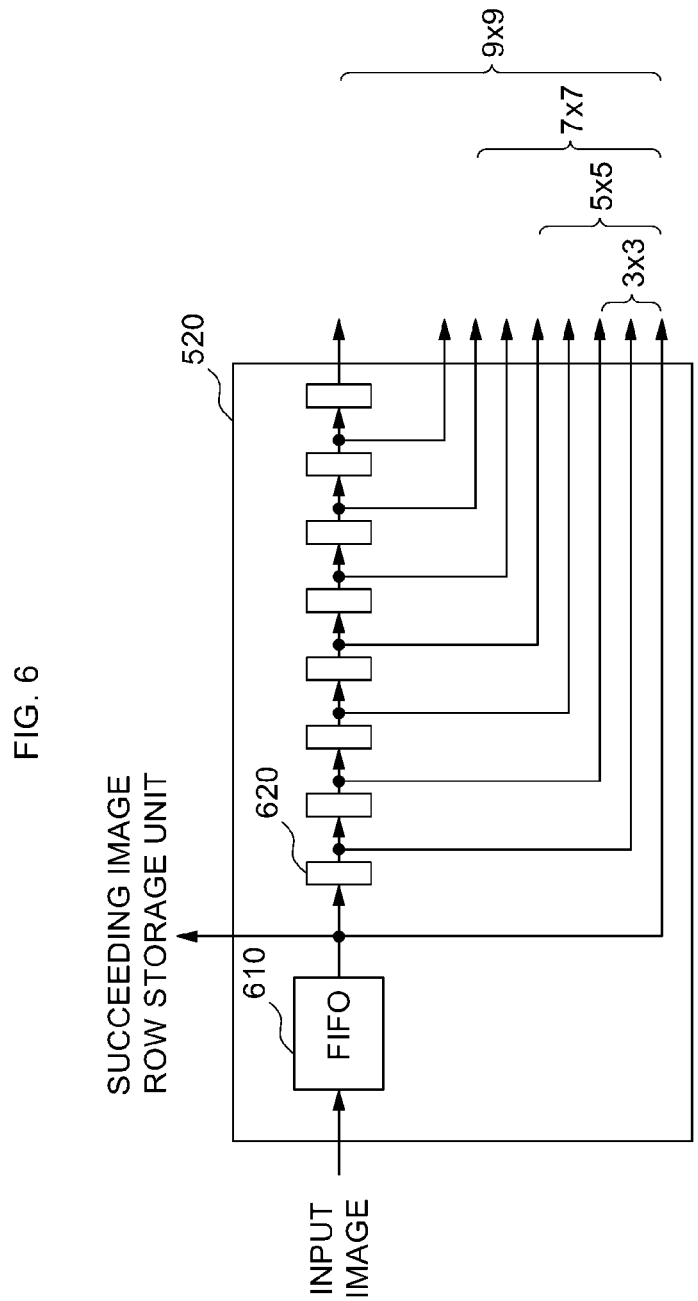
FIG. 6 is a diagram illustrating an image row storage unit included in an image buffer of an apparatus for Gaussian filtering according to an exemplary embodiment of the present invention.

FIG. 5 is a diagram illustrating an image buffer of an apparatus for Gaussian filtering according to an exemplary embodiment of the present invention, and FIG. 6 is a diagram illustrating an image row storage unit included in an image buffer of an apparatus for Gaussian filtering according to an exemplary embodiment of the present invention.

Referring to FIG. 5, the image buffer 110 may include a plurality of delay elements 510 and a plurality of image row storage units 520.

Each of the plurality of delay elements 510 stores pixel values of a single pixel. When new pixel values are received from an outside, each of the plurality of delay elements 510 outputs pre-stored pixel values and stores new pixel values. Here, the plurality of delay elements 510 may be serially connected to each other as shown in FIG. 5. Here, each of the plurality of delay elements 510 may output the pre-stored pixel values to a delay element corresponding to a next order, hereinafter referred to as a succeeding delay element, and to the Gaussian filter core 120. Particularly, because the succeeding delay element does not exist at a last delay element among the plurality of delay elements 510, the last delay element outputs the pre-stored pixel values to the Gaussian filter core 120.

Each of the plurality of image row storage units 520 stores a single row of the input image, and outputs pixel values corresponding to a region in which a mask is located among the pixel values included in the corresponding row. Here, each of the plurality of image row storage units 520 may be serially connected to each other. When another adjacent image row storage unit exists and all the pixel values corresponding to the single row of the input image are received, each of the plurality of image row storage units 520 transmits the pixel values to another adjacent image row storage unit. Therefore, the uppermost image row storage unit of the image row storage units shown in FIG. 5 may store a row of the input image received at earliest time, and output pixel values included in the corresponding row.

Referring to FIG. 6, the image buffer 110 may include a first-in first-out (FIFO) module 610 and a plurality of delay elements 620.

The FIFO module 610 stores the pixel values corresponding to the single row received from an outside or one of the plurality of image row storage units 520. The FIFO module 610 sequentially (in a first-in first-out way) transmits the pixel values corresponding to the single row to a delay element 620 connected to the FIFO module 610 and a FIFO module of another image row storage unit connected to the current image row storage units 520.

The plurality of delay elements 620 may be serially connected to each other as shown in FIG. 6. Here, each of the plurality of delay elements 620 may output the pre-stored pixel values to a succeeding delay element and the Gaussian filter core 120. Particularly, because the succeeding delay element does not exist at a last delay element among the plurality of delay elements 620, the last delay element outputs the pre-stored pixel values to the Gaussian filter core 120.

Here, the Gaussian filter core 120 may select mask region data, which is a part of outputs of the plurality of delay elements 510 and the plurality of image row storage units 520 according to a size of a mask and perform the Gaussian filtering. For example, when the size of the mask is 3×3, the Gaussian filter core 120 may select pixel values output along a path of 3×3 exemplified in FIG. 6 from each image row storage unit 520, and perform the Gaussian filtering. Further, when the size of the mask is 3×3, the Gaussian filter core 120 may select pixel values output without passing the delay element 510 as shown in FIG. 5 and pixel values output through two delay elements 510 in an early stage and perform the Gaussian filtering. Further, when the size of the mask is 3×3 as shown in FIG. 5, the Gaussian filter core 120 may select a part of pixel values output without passing the delay element 510, pixel values output through the delay elements 510, and pixel values output through two image row storage units 520 in a lower order according to the process described above.

Even when the size of the mask is 5×5, 7×7, or 9×9, the Gaussian filter core 120 may adaptably perform the Gaussian filtering on the size of the mask by receiving only pixel values output through paths exemplified in FIGS. 5 and 6. Here, the controller 130 may transmit a mask size determining signal which determines the size of the mask to the Gaussian filter core 120, and the Gaussian filter core 120 may select pixel values in response to the mask size determining signal.

Therefore, pixel values received by the Gaussian filter core 120 among pixel values output from the image buffer 110 correspond to the mask region data described above. The image buffer 110 may change the paths through which pixel values of the input image are periodically output using the structure described above and output, and the Gaussian filter core 120 may select pixel values according to paths through which the pixel values are output to obtain pixel values of the input image corresponding to a location of each mask.

Figure 7:
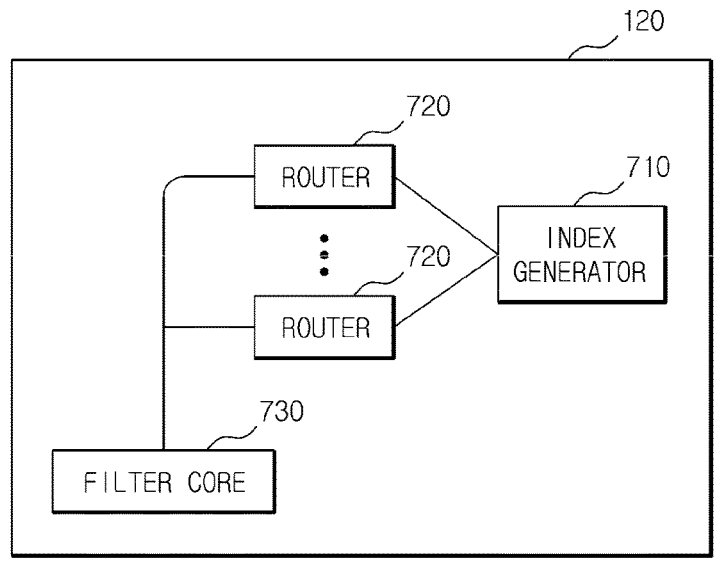
FIG. 7 is a diagram illustrating a Gaussian filter core of an apparatus for Gaussian filtering according to an exemplary embodiment of the present invention.
Figure 8:
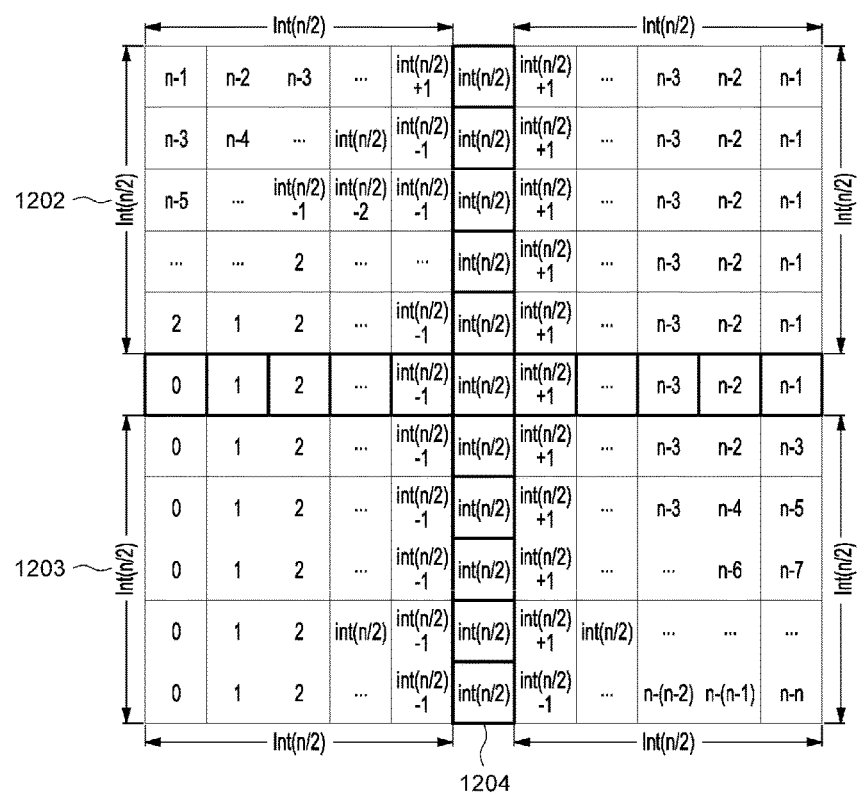
FIG. 8 is a diagram illustrating an array of index stored in an index generator of a Gaussian filter core of an apparatus for Gaussian filtering according to an exemplary embodiment of the present invention.
Figure 9A:
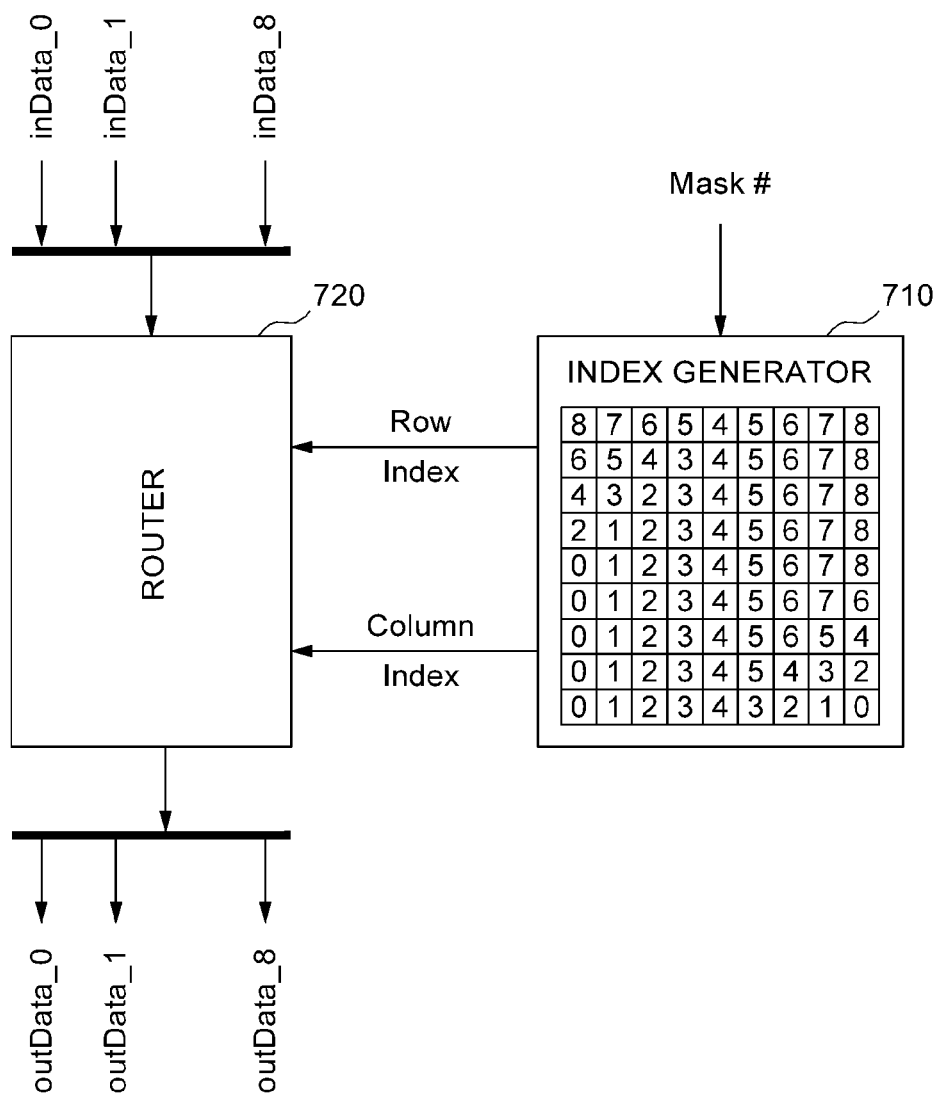
FIG. 9A is a diagram conceptually illustrating an operating process of a router included in a Gaussian filter core of an apparatus for Gaussian filtering according to an exemplary embodiment of the present invention.
Figure 9B:
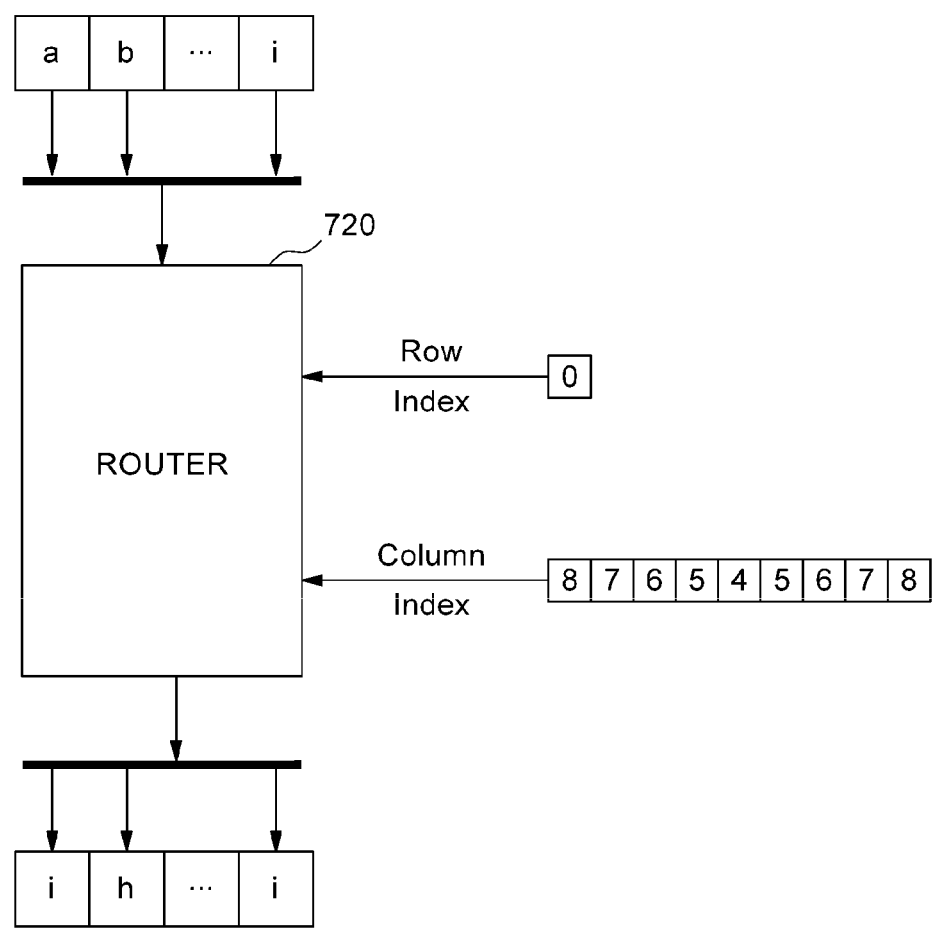
FIG. 9B is a diagram conceptually illustrating an operating process of a router included in a Gaussian filter core of an apparatus for Gaussian filtering according to an exemplary embodiment of the present invention with row index and column index.
Figure 10:
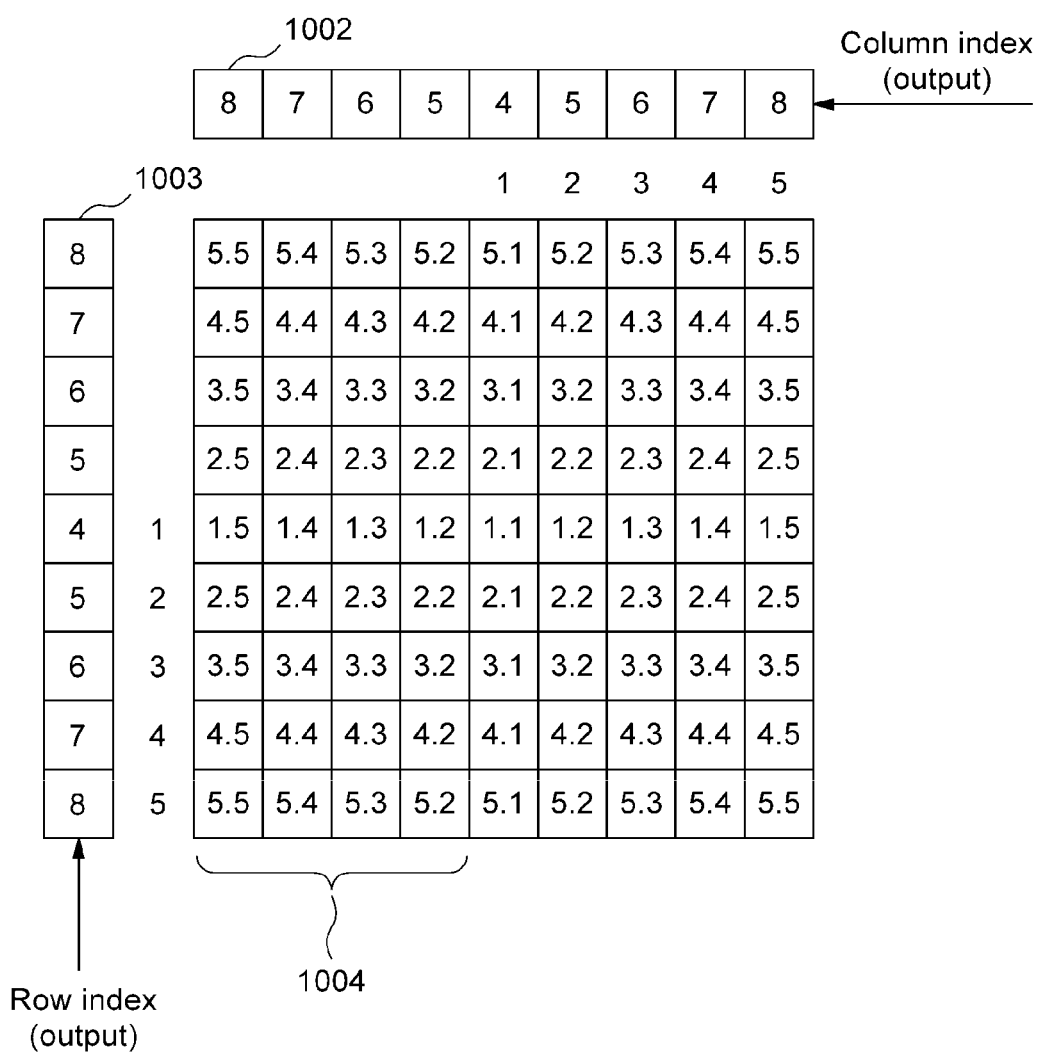
FIG. 10 is a diagram illustrating a result of mirroring performed according to a column index and a row index by a router included in a Gaussian filter core of an apparatus for Gaussian filtering according to an exemplary embodiment of the present invention.

FIG. 7 is a diagram illustrating a Gaussian filter core of an apparatus for Gaussian filtering according to an exemplary embodiment of the present invention, FIG. 8 is a diagram illustrating an array of index stored in an index generator of a Gaussian filter core of an apparatus for Gaussian filtering according to an exemplary embodiment of the present invention, FIG. 9A is a diagram conceptually illustrating an operating process of a router included in a Gaussian filter core of an apparatus for Gaussian filtering according to an exemplary embodiment of the present invention, FIG. 9B is a diagram conceptually illustrating an operating process of a router included in a Gaussian filter core of an apparatus for Gaussian filtering according to an exemplary embodiment of the present invention with row index and column index, FIG. 10 is a diagram illustrating a result of mirroring performed according to a column index and a row index by a router included in a Gaussian filter core of an apparatus for Gaussian filtering according to an exemplary embodiment of the present invention, and FIG. 11A is a diagram illustrating a result of mirroring performed according to a column index and a row index based on coordinate of one mask center by a router included in a Gaussian filter core of an apparatus for Gaussian filtering according to an exemplary embodiment of the present invention, FIG. 11B is a diagram illustrating a result of mirroring performed according to a column index and a row index based on coordinate of another mask center by a router included in a Gaussian filter core of an apparatus for Gaussian filtering according to an exemplary embodiment of the present invention, FIG. 11C is a diagram illustrating a result of mirroring performed according to a column index and a row index based on coordinate of yet another mask center by a router included in a Gaussian filter core of an apparatus for Gaussian filtering according to an exemplary embodiment of the present invention.

Referring to FIG. 7, the Gaussian filter core 120 of the apparatus for Gaussian filtering may include an index generator 710, a plurality of routers 720 and a filter core 730.

The index generator 710 receives information on a mask size from the controller 130, generates an index which is a reference with which the router 720 rearranges pixel values received from the image buffer 110 according to a mask size and a mask location, and transmits the index to each router 720. Here, the index generator 710 may transmit the index corresponding to the mask location to each router 720 referring to a pre-stored index array. Referring to FIG. 8, the index array may be an array including an index determined based on the mask size, which is n×n and in which n is an odd number equal to or greater than 3. Values of 0 to n−1 may be sequentially arranged in an $(int(n/2)+1)^{th}$ row (hereinafter called a row of normal state) of the index array. Further, each of the indexes (hereinafter called an intermediate column index) located in an $(int(n/2)+1)^{th}$ column of the index array has a value of int(n/2). Further, each of the indexes located above the row of a normal state of indexes in the index array may have a value bigger by one than an index adjacent to the right side when an index column is less than (int(n/2)+1-index row), and may have a value smaller by one than the index adjacent to the right side when an index column is equal to or greater than (int(n/2)+1-index row). Further, each of the indexes located below the row of normal state of indexes in the index array may have a value smaller by one than an index adjacent to the left side when an index column is greater than (int(n/2)+(n-index row)), and may have a value bigger by one than an index adjacent to the left side when an index column is equal to or less than (int(n/2)+(n-index row)). Here, the index column is the column number of the index and the index row is the row number of the index. Further, int(a) denotes a function which changes a real number a into an integer number.

The index generator 710 may extract the row index and the column index corresponding to a row of the index array which corresponds to a coordinate (hereinafter called a coordinate of a mask center) at which a central point, which is a point corresponding to a coordinate of (int(n/2)+1) on the mask, of the mask is located on the image of input data, and may transfer the row index and the column index to the router 720. In an exemplary embodiment, when the coordinate of the mask center is (a, b), the index generator 710 may determine whether a or b is equal to or smaller than int(n/2). When a is equal to or smaller than int(n/2), the index generator 710 may transmit the index corresponding to an $a^{th}$ row of the index array to the router 720 as a row index. When a is greater than int(n/2) and equal to or smaller than (h-int(n/2)) (h is a height of an image), the index generator 710 may transmit the index (0 to n−1) corresponding to the row of a normal state to the router 720. When a is greater than (h-int(n/2), the index generator 710 may transmit the index corresponding to a $(n-a)^{th}$ row of the index array to the router 720 as a row index. When b is equal to or smaller than int(n/2), the index generator 710 may transmit the index corresponding to a $b^{th}$ row of the index array to the router 720 as a column index. When b is greater than int(n/2) and equal to or smaller than (w-int(n/2)) (w is a width of an image), the index generator 710 may transmit the index (0 to n−1) corresponding to the row of normal state to the router 720 as a column index. When a is greater than (w-int(n/2), the index generator 710 may transmit the index corresponding to a $(n-a)^{th}$ row of the index array to the router 720 as a column index.

The router 720 may arrange mask region data, which is pixel values received from the image buffer 110 based on the row index and the column index received from the index generator 710, and output the mask region data. Referring to FIG. 9a, the router 720 receives a plurality of pixel values (when a mask size is 9×9, 81 pixel values, inData_0 to inData_80) from the image buffer 110, generates pixel array values, which are values in which one or more of the pixel values received from the image buffer 110 based on the row index and the column index received from the index generator 710 are arranged, and transmits the pixel array values to the filter core 730. Here, the plurality of routers 720 may be provided, and each of the routers 720 receives whole pixel values, and then generates pixel array values in which a part of the whole pixel array values are arranged based on the row index and the column index, and then transmits the pixel array values to the filter core 730. In an exemplary embodiment, as shown in FIG. 9b, when the row index 0 and the column indexes {8, 7, 6, 5, 4, 5, 6, 7, and 8} are received, the routers 720 may arrange a part (pixel values corresponding to column indexes 4 to 8) of pixel values for a row corresponding to the row index 0 to correspond to the column index, and generate the pixel arrange values. That is, when pixel values corresponding to the row index 0 of the received pixel values are a, b, c, d, e, f, g, h, and i, the router 720 may generate i, h, g, f, e, f, g, h, and i which is an array of pixel values having an order based on the column indexes {8, 7, 6, 5, 4, 5, 6, 7, and 8} as pixel array values. As described above, each router 720 may output one row of pixel array values to which mirroring is applied. Therefore, when a mask of 3×3 is applied, three routers 720 may generate the pixel array values, and when a mask of 9×9 is applied, nine routers 720 may generate the pixel array values. Referring to FIG. 10, when the coordinate of mask center is (1, 1), the router 720 may receive one of a column index 1002 and a row index 1003 to generate the pixel array values. Therefore, as shown in FIG. 10, when pixel array values output from the routers 720 are displayed in a matrix, it becomes a matrix on which mirroring is performed. That is, even when a central point of a mask, which is a pixel denoted by a circle as shown in FIG. 11, changes and a mask location is changed, the routers 720 may adaptably perform mirroring for the Gaussian filtering. Here, the coordinate of the mask center in FIG. 12a is (1, 1), the coordinate of the mask center in FIG. 12b is (1, 2), and the coordinate of the mask center in FIG. 12a is (1, 3).

The filter core 730 applies the Gaussian filtering on a matrix in which pixel array values are represented in one row to generate Gaussian filtering values.

Figure 12:
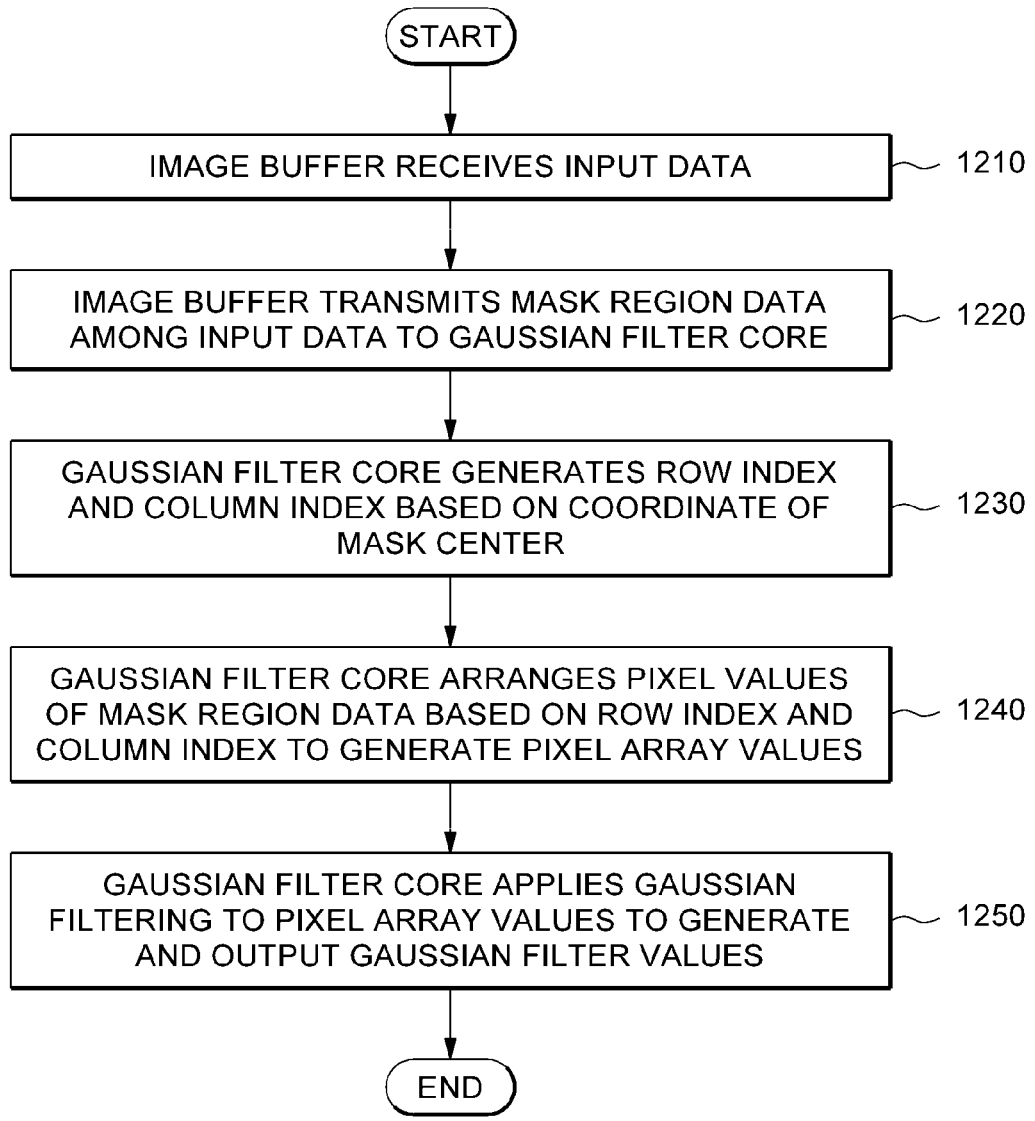
FIG. 12 is a flowchart illustrating a process of performing Gaussian filtering by an apparatus for Gaussian filtering according to an exemplary embodiment of the present invention.

FIG. 12 is a flowchart illustrating a process of performing Gaussian filtering by an apparatus for Gaussian filtering according to an exemplary embodiment of the present invention.

Referring to FIG. 12, in an operation 1210, the image buffer 110 receives input data.

In an operation 1220, the image buffer 110 transmits mask region data of input data to the Gaussian filter core 120. In an exemplary embodiment, the image buffer 110 transmits pixel data located on the mask of the input data to the filter core 730. The process of outputting the mask region data by the image buffer 110 is described above referring to FIGS. 5 and 6.

In an operation 1230, the Gaussian filter core 120 generates a row index and a column index based on a coordinate of a mask center. In an exemplary embodiment, the Gaussian filter core 120 may determine indexes for a row corresponding to an x coordinate and a y coordinate of the coordinate of the mask center of a predetermined index array as the row index and the column index. The process of generating the row index and the column index by the Gaussian filter core 120 has been described in detail above referring to FIGS. 7 and 8.

In an operation 1240, the Gaussian filter core 120 arranges pixel values of the mask region data based on the row index and the column index to generate pixel array values. The detailed process of generating the pixel array values by the Gaussian filter core 120 has been described in detail above referring to FIGS. 9 to 11.

In an operation 1250, the Gaussian filter core 120 applies the Gaussian filtering to pixel array values to generate and output the Gaussian filtering values.

Therefore, an apparatus and method for Gaussian filtering according to an exemplary embodiment of the present invention performs a process of Gaussian filtering and a process of mirroring, which is a process of preprocessing of the Gaussian filtering, through a hardware structure, and thereby a time required for the Gaussian filtering can be reduced compared to a case in which the Gaussian filtering is performed through software.

As described above, according to an exemplary embodiment of the present invention, Gaussian filtering on a high-resolution image may be performed in real time.

The apparatus for Gaussian filtering according to an exemplary embodiment of the present described above may be implemented by a computer system.

Figure 13:
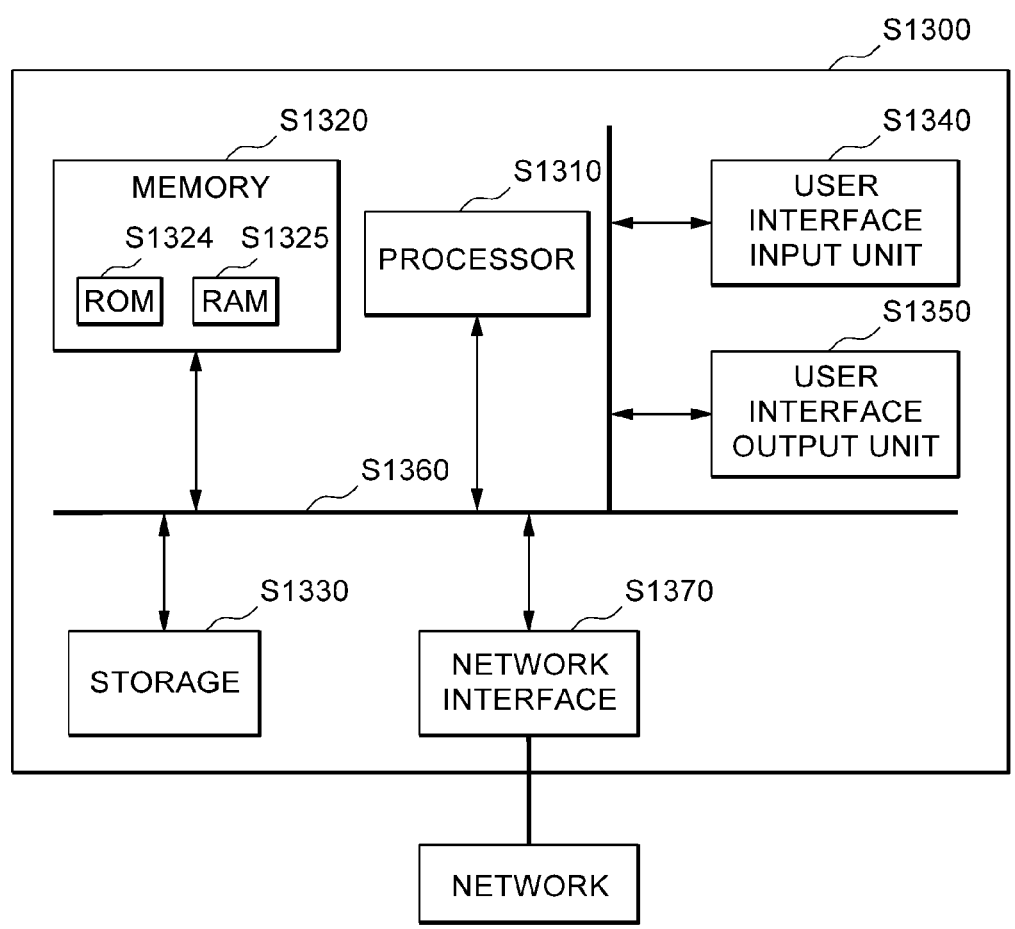
FIG. 13 is a view illustrating a computer system in which the apparatus for transforming image according to an exemplary embodiment of the present invention is implemented.

FIG. 13 is a view illustrating a computer system in which the apparatus for Gaussian filtering according to an exemplary embodiment of the present invention is implemented.

An exemplary embodiment according to the present invention may be implemented by, for example, a computer-readable recording medium in the computer system. As illustrated in FIG. 13, the computer system 1300 may include at least one of one or more processors 1310, a memory 1320, a storing unit 1330, a user interface input unit 1340, and a user interface output unit 1350, which may communicate with each other through a bus 1360. In addition, the computer system 1300 may further include a network interface 1370 for accessing a network. The processor 1310 may be a central processing unit (CPU) or a semiconductor element executing processing commands stored in the memory 1320 and/or the storing unit 1330. The memory 1320 and the storing unit 1330 may include various types of volatile/non-volatile storage media. For example, the memory may include a read only memory (ROM) 1324 and a random access memory (RAM) 1325.

This written description sets forth the best mode of the invention and provides examples to describe the invention and to enable a person of ordinary skill in the art to make and use the invention. The specification drafted as such is not limited to detailed terms suggested in the specification. Accordingly, it will be apparent to those skilled in the art that various modifications, changes, and variations may be made in the example without departing from the scope of the invention.

What is claimed is:

1. An apparatus for Gaussian filtering, comprising:
   an image buffer configured to generate mask region data which includes pixel values of pixels located on a mask in an input image; and
   a Gaussian filter core configured to arrange the mask region data to generate pixel array values referring to an index array corresponding to a size of the mask, and apply Gaussian filtering to the pixel array values to generate Gaussian filtering values.

2. The apparatus of claim 1, wherein the image buffer comprises:
   a plurality of first delay elements serially connected to each other configured to sequentially receive and store the pixel values of the input image, and output the stored pixel values of the input image to the Gaussian filter core; and
   a plurality of image row storage units serially connected to each other configured to output pixel values corresponding to a single row of the input image to the Gaussian filter core when all the pixel values corresponding to the single row are received,
   wherein at least one of the plurality of first delay elements outputs the pixel values of the input image to another one of the first delay elements, and at least one of the plurality of image row storage units outputs the pixel values corresponding to the single row to another one of the image row storage units.

3. The apparatus of claim 2, wherein each of the plurality of image row storage units comprises:
   a plurality of second delay elements serially connected to each other configured to sequentially receive and store the pixel values corresponding to the single row, and output the stored pixel values corresponding to the single row to the Gaussian filter core; and
   a first-in first-out (FIFO) module configured to sequentially output the pixel values corresponding to the single row to the other image row storage unit, one of the plurality of second delay elements, and the Gaussian filter core when all the pixel values corresponding to the single row from the other image row storage unit or an outside are received,
   wherein at least one of the plurality of second delay elements outputs the pixel values of the input image to another one of the plurality of second delay elements.

4. The apparatus of claim 1, wherein the Gaussian filter core comprises:
   an index generator configured to generate a row index and a column index referring to the index array corresponding to the size of the mask;

a plurality of routers configured to arrange a part of the mask region data based on the row index and the column index to generate the pixel array values; and a filter core configured to apply the Gaussian filtering to a matrix having the pixel array values as one row to generate the Gaussian filtering values.

5. The apparatus of claim 4, wherein the index generator generates the row index and the column index, each of which includes an index corresponding to a coordinate of a mask center in the index array, the index corresponding to each row.

6. The apparatus of claim 5, wherein an $(int(n/2)+1)^{th}$ row of the index array is a row in which values of 0 to n−1 are sequentially arranged, and each of indexes located in an $(int(n/2)+1)^{th}$ column of the index array has a value of int(n/2), and each of indexes located above the $(int(n/2)+1)^{th}$ row among indexes of the index array has a value bigger by one than an index adjacent to the right side when an index column is less than (int(n/2)+1-index row), and has a value smaller by one than the index adjacent to the right side when an index column is equal to or greater than (int(n/2)+1-index row), and each of indexes located below the $(int(n/2)+1)^{th}$ row among indexes of the index array has a value smaller by one than an index adjacent to the left side when an index column is greater than (int(n/2)+(n-index row), and has a value bigger by one than the index adjacent to the left side when an index column is equal to or less than (int(n/2)+(n-index row), wherein n is a horizontal length or vertical length of the mask, and the index column is the column number of the index and the index row is the row number of the index, and the int(n/2) is an integer number of n/2.

7. The apparatus of claim 4, wherein each of the plurality of routers arranges a pixel value corresponding to each index included in the row index of the pixel values located in a row corresponding to the row index in the mask region data according to a location on the row index of the index to generate the pixel array values.

8. A method for performing Gaussian filtering on an input image by an apparatus for Gaussian filtering including an image buffer and a Gaussian filter core, the method comprising:

generating, by the image buffer, mask region data which includes pixel values of pixels located on a mask in an input image;

arranging, by the Gaussian filter core, the mask region data referring to an index array corresponding to a size of the mask to generate pixel array values; and applying, by the Gaussian filter, Gaussian filtering to the pixel array values to generate Gaussian filtering values.

9. The method of claim 8, wherein the generating by the image buffer of the mask region data which includes the pixel values of the pixels located on the mask in the input image is performed by the image buffer including:

a plurality of first delay elements serially connected to each other configured to sequentially receive and store the pixel values of the input image and output the stored pixel values of the input image to the Gaussian filter core; and a plurality of image row storage units serially connected to each other configured to output pixel values corresponding to a single row of the input image to the Gaussian filter core when all the pixel values corresponding to the single row are received, wherein at least one of the plurality of first delay elements outputs the pixel values of the input image to another one of the plurality of first delay elements, and at least one of the plurality of image row storage units outputs the pixel values corresponding to the single row to another one of the plurality of image row storage units.

10. The method of claim 9, wherein the generating by the image buffer of the mask region data which includes the pixel values of the pixels located on the mask in the input image is performed by the image buffer that includes a plurality of image row storage units, each image row storage unit including:

a plurality of second delay elements serially connected to each other configured to sequentially receive and store the pixel values corresponding to the single row and output the stored pixel values corresponding to the single row to the Gaussian filter core; and a first-in first-out (FIFO) module configured to sequentially output the pixel values corresponding to the single row to the other image row storage unit, one of the plurality of second delay elements, and the Gaussian filter core when all the pixel values corresponding to the single row from the other one of the plurality of image row storage units or an outside are received, wherein at least one of the plurality of second delay elements outputs the pixel values of the input image to the other one of the plurality of second delay elements.

11. The method of claim 8, wherein the arranging by the Gaussian filter core of the mask region data to generate the pixel array values referring to the index array corresponding to the size of the mask comprises:

generating, by an index generator, a row index and a column index referring to the index array corresponding to the size of the mask;

arranging, by a plurality of routers, a part of the mask region data based on the row index and the column index to generate the pixel array values; and applying, by a filter core, the Gaussian filtering to a matrix having the pixel array values as one row to generate the Gaussian filtering values.

12. The method of claim 11, wherein the generating by the index generator of the row index and the column index referring to the index array corresponding to the size of the mask includes generating the row index and the column index, each of which includes an index corresponding to a coordinate of a mask center of the index array, the index corresponding to each row.

13. The method of claim 12, wherein an $(int(n/2)+1)^{th}$ row of the index array is a row in which values of 0 to n−1 are sequentially arranged, and each of indexes located in an $(int(n/2)+1)^{th}$ column of the index array has a value of int(n/2), and each of indexes located above the $(int(n/2)+1)^{th}$ row among indexes of the index array has a value of bigger by one than an index adjacent to the right side when an index column is less than (int(n/2)+1-index row), and has a value smaller by one than an index adjacent to the right side when an index column is equal to or greater than (int(n/2)+1-index row), and each of indexes located below the $(int(n/2)+1)^{th}$ row among indexes of the index array has a value smaller by one than an index adjacent to the left side when an index column is greater than (int(n/2)+(n-index row), and has a value bigger by one than an index adjacent to the left side when an index column is equal to or less than (int(n/2)+(n-index row), wherein n is a horizontal length or vertical length of the mask, and the index column is the column number of the index and the index row is the row number of the index, and the int(n/2) is an integer number of n/2.

14. The method of claim 11, wherein the arranging by a plurality of routers of a part of the mask region data based on the row index and the column index to generate the pixel array values is performed by each of the plurality of routers configured to arrange a pixel value corresponding to each index included in the row index of the pixel values located in a row corresponding to the row index in the mask region data according to a location on the row index of the index to generate the pixel array values.

* * * * *